(12) United States Patent
Campbell

(10) Patent No.: US 6,543,811 B1
(45) Date of Patent: *Apr. 8, 2003

(54) PIPE FLANGE ASSEMBLY

(76) Inventor: Robert W. Campbell, 124 Clara, Schriever, LA (US) 70395

( * ) Notice: Subject to any disclaimer, the term of this patent is extended or adjusted under 35 U.S.C. 154(b) by 0 days.

This patent is subject to a terminal disclaimer.

(21) Appl. No.: 09/385,902

(22) Filed: Aug. 30, 1999

Related U.S. Application Data

(63) Continuation-in-part of application No. 08/759,272, filed on Dec. 2, 1996, now Pat. No. 5,947,528.

(51) Int. Cl.$^7$ ................................................ F16L 55/00
(52) U.S. Cl. ..................... 285/16; 285/55; 285/363; 285/416
(58) Field of Search .............. 285/906, 16, 148.23, 285/148.25, 148.24, FOR 159, 120, 55, 416, 336, 363; 406/193

(56) References Cited

U.S. PATENT DOCUMENTS

| | | | |
|---|---|---|---|
| 1,601,093 A | * | 9/1926 | Widmeyer |
| 2,072,893 A | * | 3/1937 | Lee |
| 2,077,035 A | * | 4/1937 | Bredeson |
| 2,144,227 A | * | 1/1939 | Penick et al. |
| 3,018,120 A | * | 1/1962 | Vann |
| 3,228,096 A | * | 1/1966 | Albro |
| 4,336,958 A | * | 6/1982 | Goetzinger ................. 285/55 |
| 4,691,740 A | * | 9/1987 | Svetlik et al. ............. 138/109 |
| 4,995,427 A | * | 2/1991 | Berchem .................... 406/193 |
| 5,947,528 A | * | 9/1999 | Campbell ..................... 285/16 |
| 6,158,782 A | * | 12/2000 | Stanley ......................... 285/50 |

FOREIGN PATENT DOCUMENTS

| | | | | |
|---|---|---|---|---|
| EP | 415260 A | * | 3/1991 | .................. 285/159 |
| JP | 5263979 A | * | 10/1993 | .................. 285/16 |

* cited by examiner

Primary Examiner—Lynne H. Browne
Assistant Examiner—David E. Bochna
(74) Attorney, Agent, or Firm—David L. Ray

(57) ABSTRACT

An erosion resistant pipe flange assembly for preventing erosion of metal pipe flanges connecting two joints of pipe. The erosion resistant pipe flange assembly includes a flange section, a reducer section integrally formed with said flange section, and a replaceable liner for preventing erosion and abrasion of the interior of said pipe flange assembly.

14 Claims, 14 Drawing Sheets

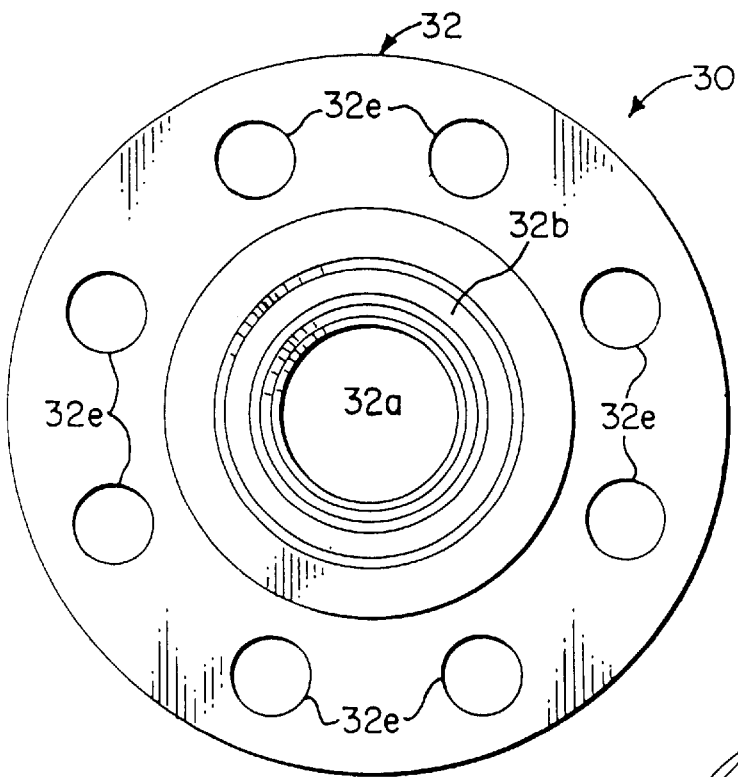
FIG. 5.
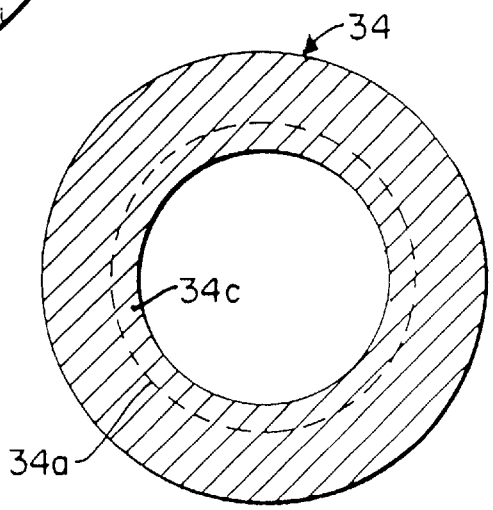
FIG. 6.
FIG. 7.
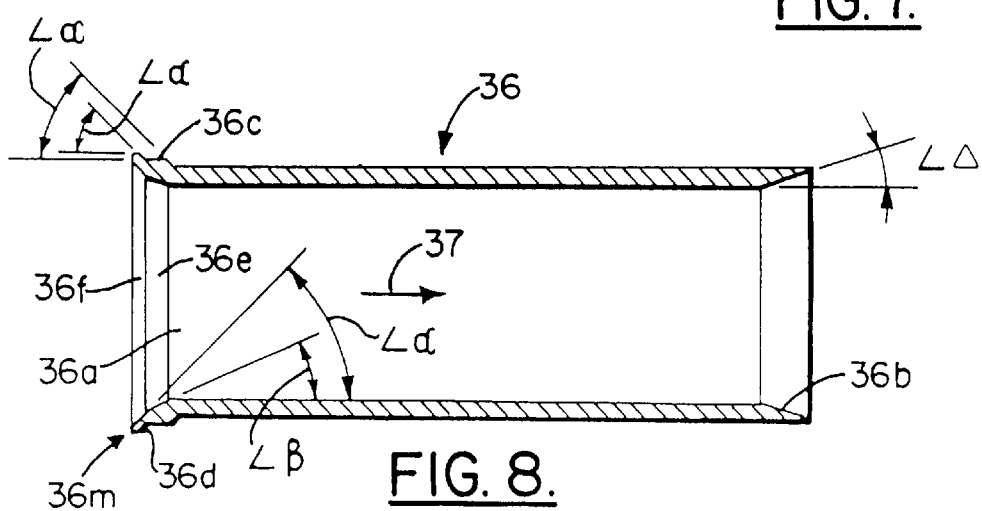
FIG. 8.

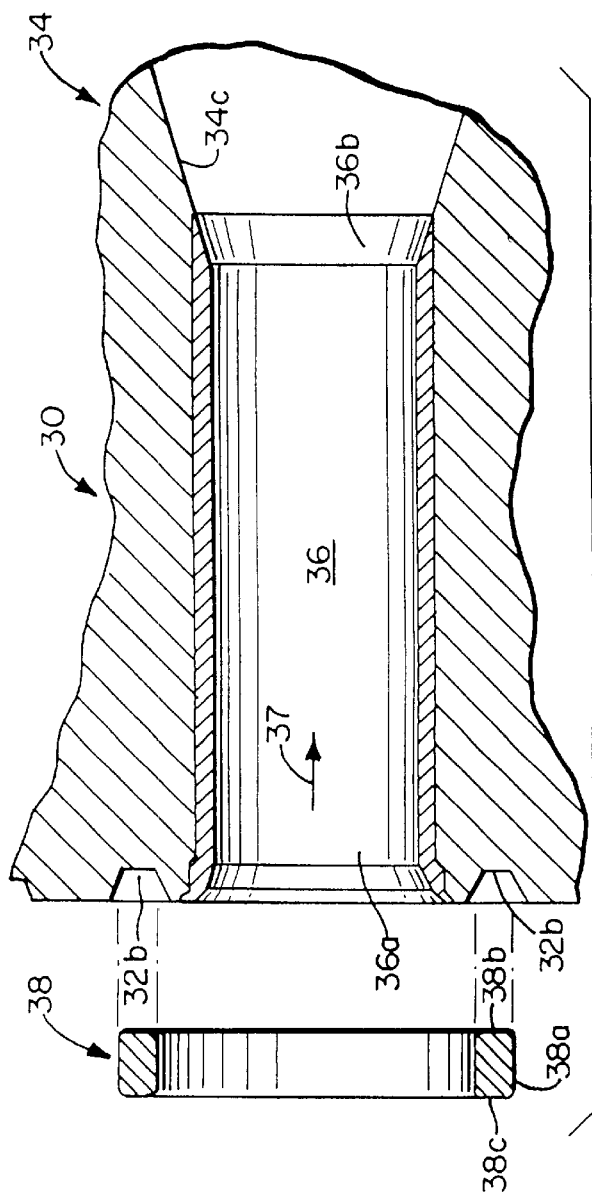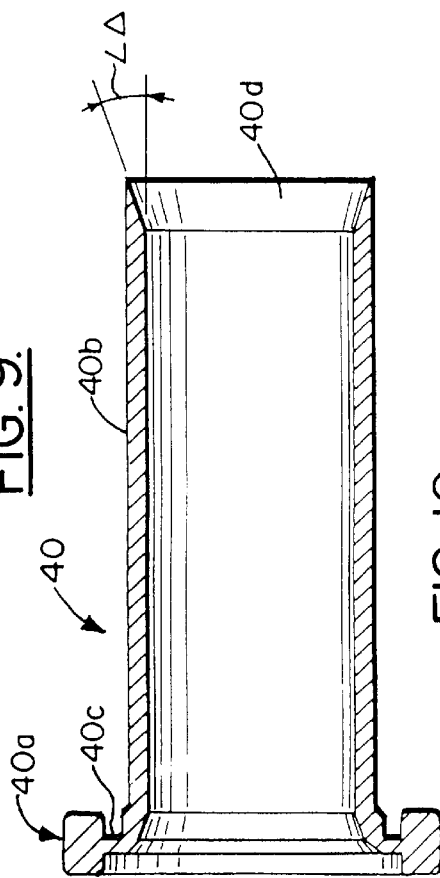
FIG. 9.
FIG. 10.

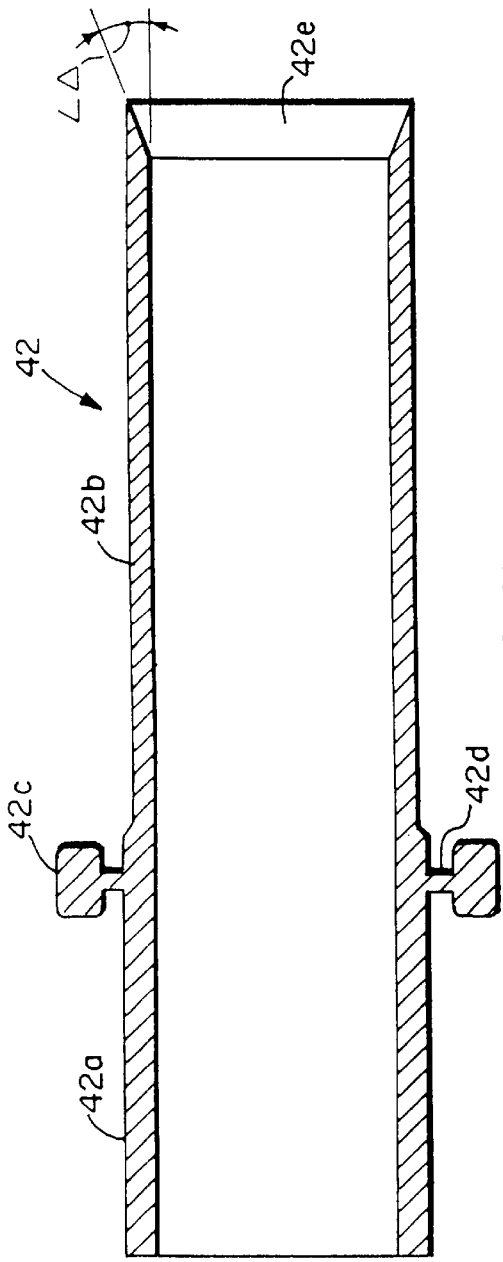
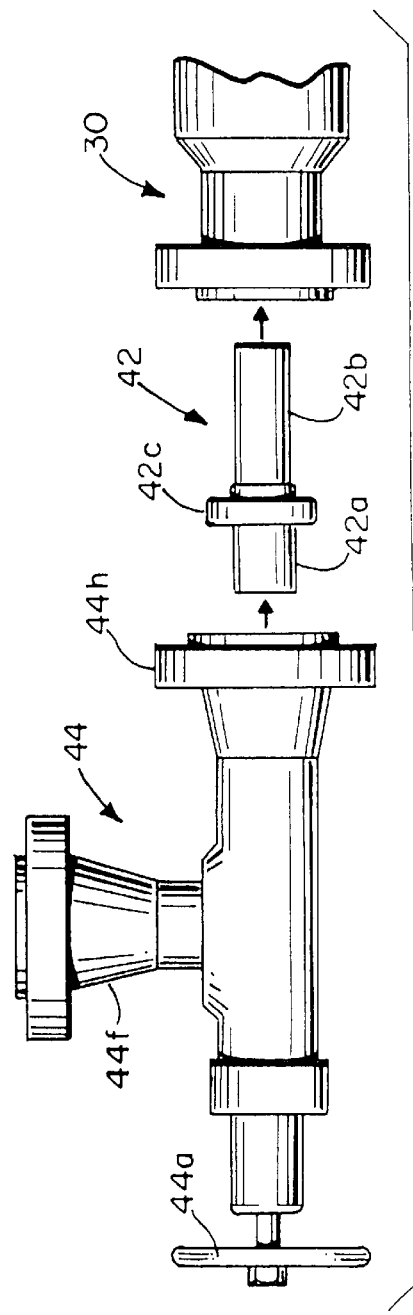

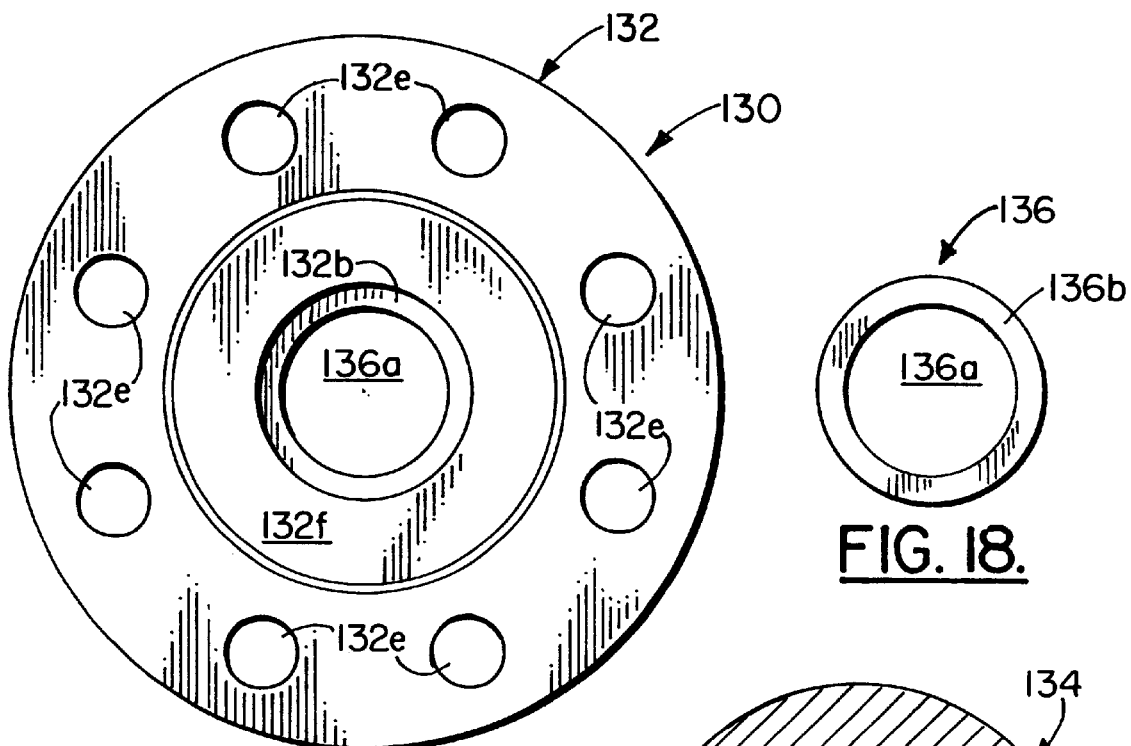
FIG. 17.
FIG. 18.
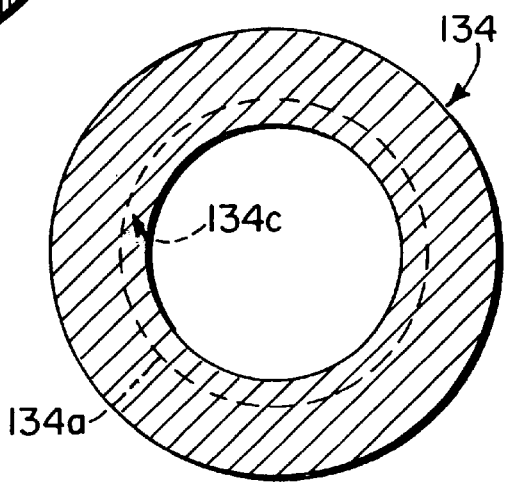
FIG. 19.
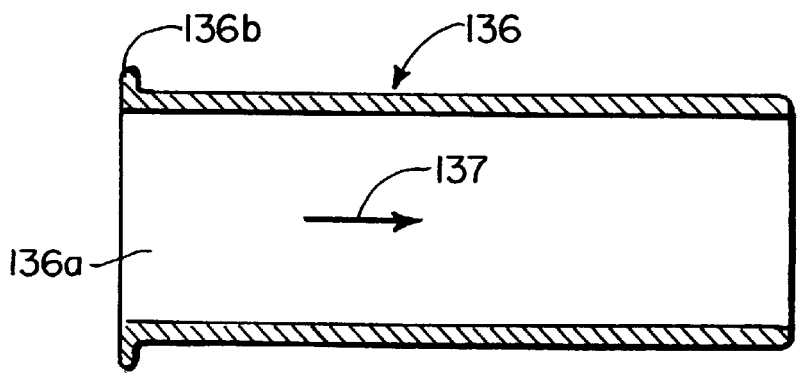
FIG. 20.

PIPE FLANGE ASSEMBLY

CROSS-REFERENCE TO RELATED APPLICATIONS

This application is a continuation-in-part of pending U.S. patent application Ser. No. 08/759,272 filed Dec. 2, 1996, now U.S. Pat. No. 5,947,528.

BACKGROUND OF THE INVENTION

1. Field of the Invention

The invention relates to pipe flanges. In particular, the invention relates to pipe flanges used in high pressure petroleum and natural gas production.

2. Description of the Related Art

Erosion and corrosion of the interior of high pressure steel pipe by the fluids flowing therethrough commonly occurs in the vicinity of the weld joint joining smaller diameter pipe to larger diameter pipe in which fluids are flowing from the smaller diameter pipe to the larger diameter pipe. The fluids flowing through such pipe may be under high pressures from 50 pounds per square inch to 10,000 pounds per square inch or more and have very high velocity flowing through the pipe and may have corrosive and abrasive elements therein. Such pressures are commonly encountered when natural gas, petroleum, and associated fluids are flowing out of deep gas and petroleum wells.

Such erosion requires constant monitoring and periodic replacement of welded metal pipe joints and flanges of such pipelines to prevent rupture of the pipeline due to erosion. Periodic replacement of welded pipe joints and flanges to prevent pipeline rupture due to erosion is expensive, sometime dangerous to personnel making the replacement, and commonly requires the interruption of flow through the pipeline. Rupture of such pipelines can cause serious injury or death of personnel in the area of the rupture, explosions, catastrophic damage to equipment, loss of expensive petroleum and gas, and serious pollution of the environment.

Elimination or reduction of the erosion of such pipe joints and flanges in high pressure pipelines is therefore highly desirable.

Exemplary of the Patents of the related art are the following U.S. Pat. Nos.: 2,290,333; 2,310,927; 2,354,900; 2,806,718; 2,982,311; 3,018,120; 3,228,096; 3,235,291; 3,284,107; 3,284,108; 4,277,091; 4,691,740 and 4,995,427.

SUMMARY OF THE INVENTION

In accordance with the present invention there is provided an erosion resistant pipe flange assembly for preventing erosion of metal pipe flanges connecting pipe. The pipe flange assembly includes a flange section, a reducer section integrally formed with the flange section, and a replaceable liner for preventing erosion of the interior of the pipe flange assembly.

The invention has the advantage of greatly reducing and/or eliminating the erosion of pipe joints and flanges by high pressure fluids flowing therein.

The invention has the additional advantage of reducing or eliminating dangerous ruptures and explosions in flange and reducer assemblies of the prior art.

BRIEF DESCRIPTION OF THE DRAWINGS

FIG. 5 is a plan view of the flange shown in FIG. 4 taken along line 5—5 of FIG. 4;

FIG. 6 is a plan view of the liner shown in FIG. 4 taken along line 6—6 of FIG. 4;

FIG. 7 is a cross-sectional, plan view of the flange shown in FIG. 4 taken along line 7—7 of FIG. 4;

FIG. 8 is an enlarged, detailed view of the liner shown in FIG. 4;

FIG. 9 is a partly cut-away, enlarged, detailed view of a portion of the flange shown in FIG. 4 with the liner seated therein and a ring aligned for placement in the flange;

FIG. 10 is a cross-sectional, enlarged, detailed view of a second embodiment of the liner of the invention having a ring connected thereto;

FIG. 11 is a side view of a third embodiment of the liner of the invention for insertion in a choke assembly and in the flange of the invention;

FIG. 12 is a side view of a third embodiment of the liner of the invention aligned for insertion in a choke assembly and in the flange of the invention;

FIG. 17 is a plan view of the flange shown in FIG. 16 taken along line 17—17 of FIG. 16;

FIG. 18 is a plan view of the liner shown in FIG. 16 taken along line 18—18 of FIG. 16;

FIG. 19 is a cross-sectional, plan view of the flange shown in FIG. 16 taken along line 19—19 of FIG. 16;

FIG. 20 is an enlarged, detailed view of the liner shown in FIG. 16;

DESCRIPTION OF THE PREFERRED EMBODIMENTS

Figure 1:
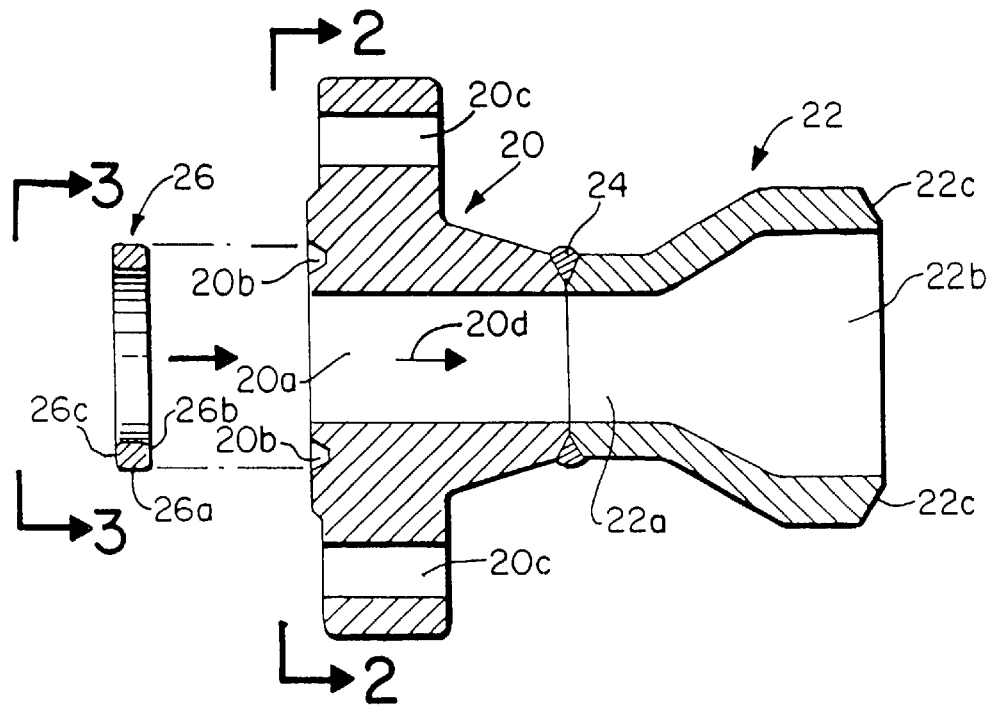
FIG. 1 is a cross-sectional, side view of a prior art flange and ring assembly having a weld neck reducer welded thereto.
Figure 3:
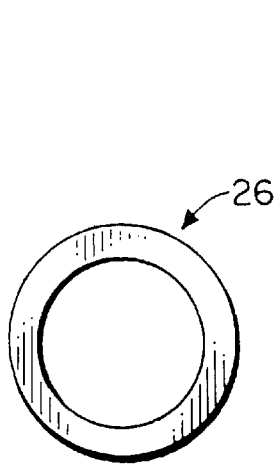
FIG. 3 is a plan view of the ring shown in FIG. 1 taken along line 3—3 of FIG. 1.
Figure 2:
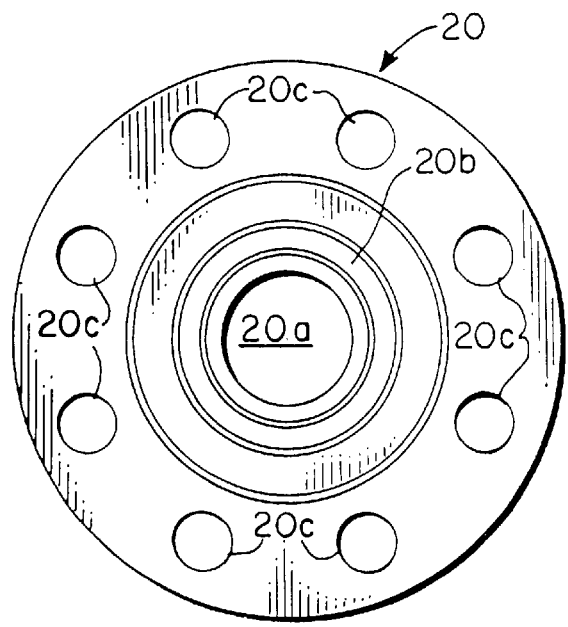
FIG. 2 is a plan view of the flange shown in FIG. 1 taken along line 2—2 of FIG. 1.

FIGS. 1–3 illustrate the conventional procedure used in the art for connecting small diameter metal pipe such as steel pipe to larger diameter metal pipe. Referring now to FIGS. 1–3, a prior art metal pipe flange is generally indicated by the numeral 20. Pipe flange 20 has a central cylindrical bore 20a through which fluids under superatmospheric pressure flow.

A prior metal art weld neck reducer generally indicated by the numeral 22 is welded to pipe flange 20 by weld 24. Weld neck reducer 22 has a central cylindrical bore 22a axially aligned with a larger central cylindrical bore 22b. The diameter of central bore 22a is identical to the diameter of central bore 20a of flange 20. Pipe (not shown) having a central bore diameter identical to the central cylindrical bore diameter 22b of weld neck reducer 22 may then be welded to the end 22c of weld neck reducer 22.

A circular ring generally indicated by the numeral 26 is aligned for placement in circular tapered groove 20b to function as a seal when a second flange (not shown) identical to flange 20 is bolted to pipe flange 20 by bolts (not shown) placed in cylindrical bolt holes 20c of flange 20. Thus, small pipe (not shown), such as two-inch steel line pipe, connected to flange 20 can be connected to larger diameter pipe (not shown), such as four-inch steel line pipe, by welding the larger pipe to the end 22c of weld neck reducer 22. Two-inch and four-inch steel line pipe referred to herein refers to the nominal size of the pipe as is known to those skilled in the art, not to the inside or outside diameter of the pipe.

Circular ring 26 is a hollow cylinder 26a having two flat faces 26b and 26c. Flat face 26b is received in groove 20b and is deformed when a second flange (not shown) is bolted to flange 20 as mentioned above. Circular ring 26 is deformed to assume the shape of groove 20b when the bolts (not shown) connecting flange 20 to the second flange (not shown) are tightened with sufficient torque to force the two flanges into contact with each Other. Thus, circular ring 26 forms a high pressure seal between flange 20 and the second flange (not shown) is bolted thereto.

In common practice, a small diameter metal pipe, such as a two-inch steel line pipe, conveys high pressure fluids such as gas and/or petroleum, to flange 20. The fluids flow through bore 20a in flange 20 in the direction indicated by the arrow 20d and onward through bore 22b of weld neck reducer 22 to a larger diameter metal pipe (not shown) welded to the end 22c of weld neck reducer 22.

Erosion of the interior walls of bore 20a of flange 20 and the interior walls of bore 22a of weld neck reducer 22 by the fluids flowing therethrough commonly occurs in the vicinity of weld 24. The fluids flowing through flange 20 and weld neck reducer 22 may be under pressures from 2,000 pounds per square inch to 10,000 pounds per square inch and have very high velocity flowing through the pipe. Petroleum and gas fluids commonly contain particles of sand therein which are abrasive and accelerate the rate of erosion in the vicinity of weld 24.

Referring now to FIGS. 4–9, the present invention can be seen to include a metal flange assembly generally indicated by the numeral 30 having a flange section generally indicated by the numeral 32 and a reducer section generally indicated by the numeral 34. Flange assembly 30 is preferably integrally formed from a single piece of high-strength, corrosion and abrasion resistant steel alloy and meets or exceeds API (American Petroleum Institute) standards for strength and dimensions.

Flange section 32 has a central cylindrical bore 32a. Reducer section 34 has a central cylindrical bore 34a axially aligned with cylindrical bore 32a and having a larger diameter than central cylindrical bore 32a Central cylindrical bore 32a is joined to central cylindrical bore 34a by a tapered or beveled section 34c. Metal pipe such as steel pipe (not shown) having a central bore diameter identical to the central cylindrical bore diameter 34a of reducer section 34 may then be welded to the end 34b of reducer section 34.

As shown in FIGS. 4, 6, 8, and 9, flange assembly 30 has a replaceable metal liner generally indicated by the numeral 36 which is received in central cylindrical bore 32a. Preferably, flange liner 36 is slidably received in said central cylindrical bore 32a and fits snugly therein. Flange liner 36 has a central cylindrical bore 36a through which fluids flow in the direction indicated by the arrow 37 shown in FIGS. 4, 8, and 9. Preferably, flange liner 36 has an interior beveled portion 36b forming an angle Δ which is aligned with the beveled portion 34c of reducer section 34 to decrease turbulence at the downstream end of flange liner 36. Liner 36 is preferably integrally formed from a single piece of high-strength, corrosion and abrasion resistant steel alloy and meets or exceeds API (American Petroleum Institute) standards for strength and dimensions.

Figure 4:
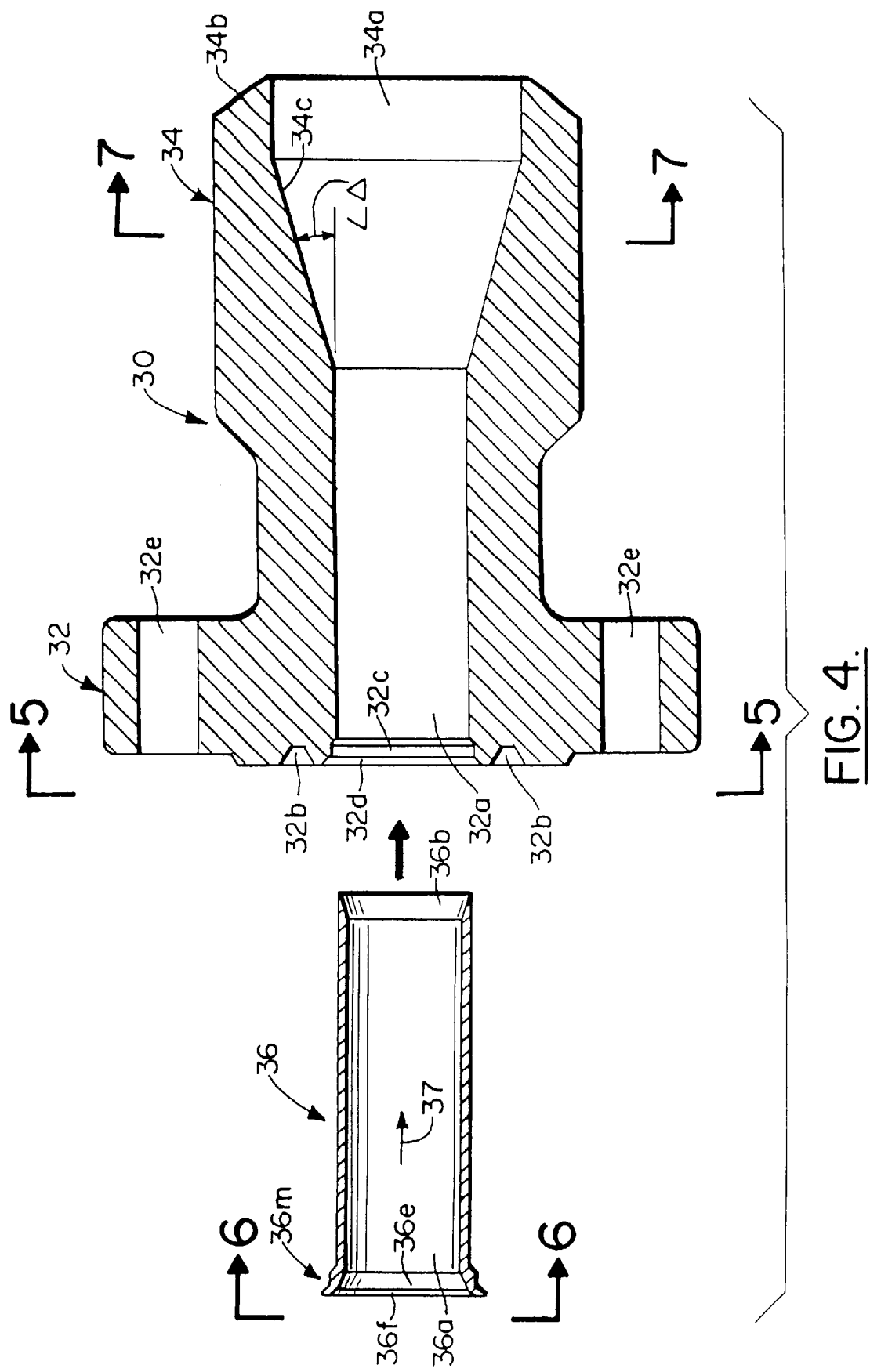
FIG. 4 is a cross-sectional, side view of the flange and liner of the invention.

Liner 36 also preferably has a lip section 36m at the upstream end thereof including two lips 36c and 36d shown in FIG. 8 at the upstream end thereof for seating liner 36 in grooves 32c and 32d, respectively, of flange section 32 shown in FIG. 4. Lips 36c and 36d have outside edges which preferably form an angle a with the outside surface of liner 36. Liner 36 also has two inside bevels 36e and 36f. Bevel 36e preferably forms an angle P with the inside surface of liner 36, and bevel 36f preferably forms an angle a with the outside surface of liner 36. Preferably angle α is 45°, angle β is 22.5°, and angle Δ is 15°. If desired, different bevel angles may be utilized, or a single bevel or arc could be utilized in the upstream end of liner 36 to reduce turbulence in the fluids flowing in the vicinity of the upstream end of liner 36.

Liner 36 has a length sufficient to completely enclose and protect the entire length of central cylindrical bore 32a from erosion by fluids and sand particles which may flow therethrough. Liner 36 is made from erosion and abrasion resistant metal alloy. Liner 36 is preferably replaced periodically as liner 36 is eroded and/or abraded by the fluids and sand particles flowing therethrough prior to liner 36 being punctured or ruptured due to erosion and/or abrasion. Periodic replacement of liner 36 prior to rupture of liner 36 prevents erosion of central cylindrical bore 32a of flange assembly 30. The resultant prevention of the erosion of central bore 32a greatly extends the life of flange assembly 30 and prevents dangerous ruptures and explosions which have occurred in flange and reducer assemblies of the prior art such as the prior art flange and weld neck reducer assemblies shown in FIGS. 1–3.

A circular ring generally indicated by the numeral 38 in FIG. 9 is aligned for placement in circular tapered groove 32b to function as a seal when a second flange (not shown) identical to flange 20 shown in FIG. 1 is bolted to flange section 32 of flange assembly 30 by bolts (not shown) placed in cylindrical bolt holes 32e of flange section 32. Thus, small pipe (not shown), such as pipe two-inch steel line pipe, connected to flange section 32 by a flange identical to flange 20, can be connected to larger diameter pipe (not shown), such four-inch steel line pipe, by welding the larger pipe to the end 34b of reducer section 34.

Circular ring 38 is identical to ring 26 shown in FIG. 1 and is a hollow cylinder 38a having two-flat faces 38b and 38c. Flat face 38b is received in groove 32b and is deformed when a second flange (not shown) identical to flange 20 is bolted to flange assembly 30 as mentioned above. Circular ring 38 is deformed to assume the shape of groove 32b when the bolts (not shown) connecting flange assembly 30 to the second flange (not shown) identical to flange 20 is tightened with sufficient torque to force the two flanges into contact with each other. Thus, circular ring 38 forms a high pressure seal between flange assembly 30 and the second flange (not shown) identical to flange 20 bolted thereto.

In FIG. 10 is shown a second embodiment of the flange liner of the invention generally indicated by the numeral 40. Flange liner 40 has ring 40a integrally formed with hollow cylindrical liner body 40b and connected to liner body 40b by rib 40c, and is otherwise identical to liner 36. Ring 40a is identical in shape to ring 38 shown in FIG. 9, and is received in groove 32b of flange assembly 30 when liner 40 is substituted for ring 38 and liner 36 in flange assembly 30. Ring 40a deforms in the same manner as ring 38 when a second flange (not shown) identical to flange 20 is bolted to flange assembly 30. Preferably, flange liner 40 has an interior beveled portion 40d having an angle a which is aligned with the beveled portion 34c of reducer section 34 to decrease turbulence at the downstream end of flange liner 40.

Figure 13:
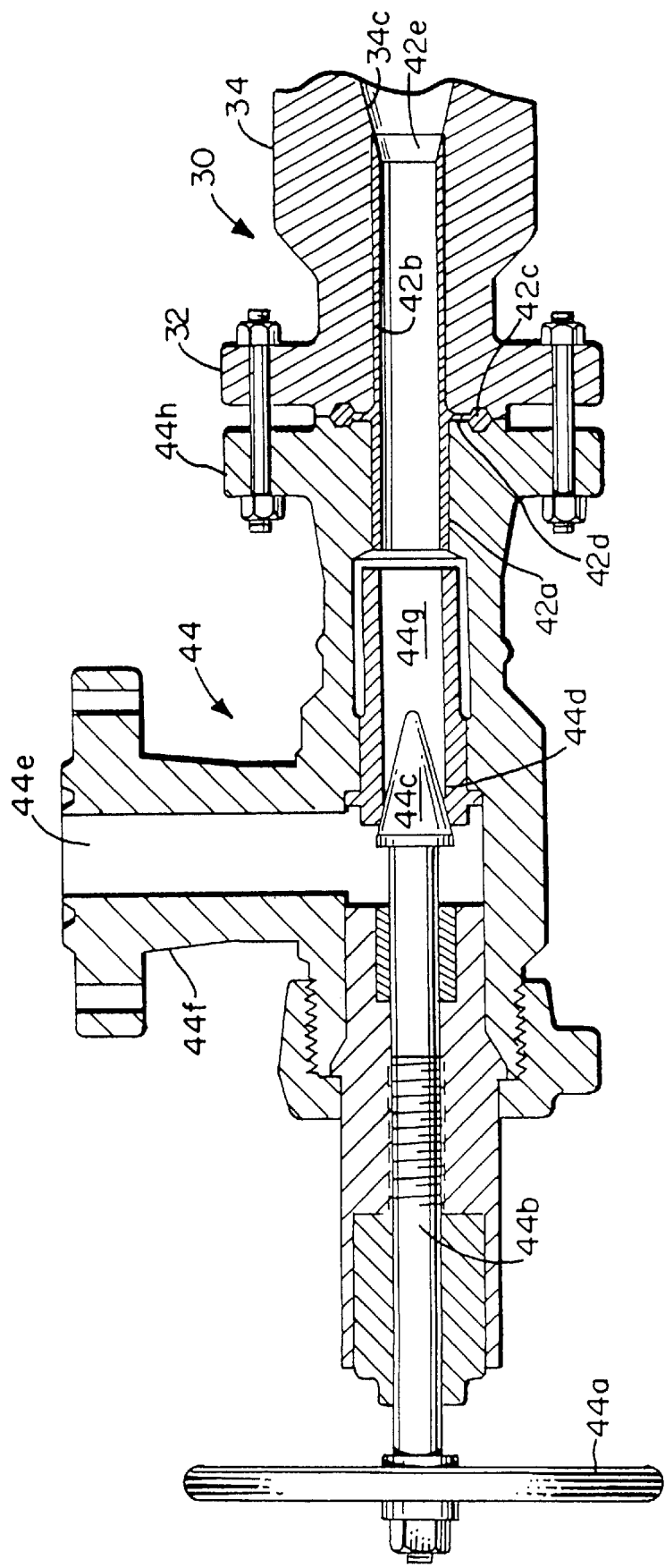
FIG. 13 is a side, partly cross-sectional view of the third embodiment of the liner of the invention inserted and seated in the choke assembly shown in FIG. 11 and the flange of the invention with the choke assembly being bolted to the flange of the invention.

In FIGS. 11–13 is shown a third embodiment of the liner of the invention generally indicated by the numeral 42. Liner 42 a is used to connect a conventional choke assembly generally indicated by the numeral 44 to the flange assembly 30 of the present invention. Liner 42 is similar to liner 40 having an additional hollow cylindrical section 42a integrally formed therewith for receipt in the discharge flange 44a of choke 44. Hollow cylindrical section 42a is preferably slidably received in discharge flange 44a and is snugly received therein. Liner 42 has a ring 42c connected to hollow cylindrical section 42a and 42b by circular rib 42d. Ring 42c is identical in shape to ring 38 shown in FIG. 9, and is received in groove 32b of flange assembly 30 when liner 42 is placed in flange assembly 30 as shown in FIG. 13. Ring 42c deforms in the same manner as ring 38 when flange 44h of choke 44 is bolted to flange assembly 30. Preferably, flange liner 42 has an interior beveled portion 42e having an angle Δ which is aligned with the beveled portion 34c of reducer section 34 to decrease turbulence at the downstream end of flange liner 42.

Choke assembly 44 is a conventional choke assembly well known in the art. As known to those skilled in the art, choke assembly 44 has a circular handle 44a connected to a rotatable threaded shaft 44b having a cone 44c on the end thereof which fits against seat 44d. As shown in FIG. 13, cone 44c is seated against seat 44d, preventing flow therethrough. When handle 44a is rotated to turn shaft 44b and withdraw cone 44c away from seat 44d, fluids can flow through hollow cylindrical passage 44e in flange 44f around cone 44c and into hollow cylindrical passage 44g in flange 44h. From passage 44f fluids flow into hollow cylindrical section 42a, hollow cylindrical section 42b, and outward through beveled portion 42e.

An additional flange (not shown) may be bolted to flange 44a of choke 44 to supply fluids such as petroleum and gas thereto. Flange assembly 30 of the invention is shown bolted in FIG. 13 to flange 44h of the discharge end of choke 44. Liner 42 prevents a erosion of the hollow cylindrical portion of flange 44a covered by hollow cylindrical section 42a of liner 42, and liner 42 prevents erosion of the portion of flange assembly 30 of the invention covered by hollow cylindrical portion 42b of liner 42.

The present invention thus greatly reduces and/or sometimes eliminates the erosion of pipe joints and flanges by high pressure fluids flowing therein. All of the liners 36, 40 and 42 are preferably replaced periodically as the liners 36, 40, and 42 are eroded and/or abraded by the fluids and sand particles flowing therethrough prior to the liners being punctured or ruptured due to erosion and/or abrasion. Periodic replacement of liners 36, 40, and 42 prior to rupture thereof prevents erosion of central cylindrical bore 32a of flange assembly 30, and periodic replacement of liner 42 also prevents the discharge port in the discharge flange of the choke from eroding. The resultant prevention of the erosion of central bore 32a greatly extends the life of flange assembly 30 and prevents dangerous ruptures and explosions which have occurred in flange and reducer assemblies of the prior art such as the prior art flange and weld neck reducer assemblies shown in FIGS. 1–3.

All of the liners 36, 40 and 42 are preferably integrally formed from a single piece of high-strength, corrosion and abrasion resistant steel alloy and meet or exceed API (American Petroleum Institute) standards for strength and dimensions. Preferably all of the liners 36, 40 and 42 are slidably received in said central cylindrical bore 32a and fit snugly therein.

Therefore, erosion of flange assembly 30 can be prevented by the method of periodically disconnecting the flange assembly 30 in which an old, abraded or eroded liner 36, 40, or 42 is located from the adjacent conventional flange connected to flange assembly 30, sliding the old liner 36, 40, or 42 out of flange assembly 30, placing a new liner 36, 40, or 42 in flange assembly 30, and reconnecting flange assembly 30 containing the new liner 36, 40, or 42 to the adjacent flange. The time interval or period of replacement of liners 36, 40, or 42 will be determined by the rate of flow, pressure, and abrasive nature of the fluids flowing therethrough, and by observing the rate of erosion and/or abrasion of the liners 36, 40, and 42 in the field or area where the liners 36, 40, and 42 and flange assemblies 30 are utilized.

Preferably flange assembly 30 is machined or formed from a solid piece of steel. However, flange assembly 30 could be formed from a reducer section being welded or otherwise bonded to a flange section, with the liner 36, 40, or 42 being placed therein.

Figure 14:
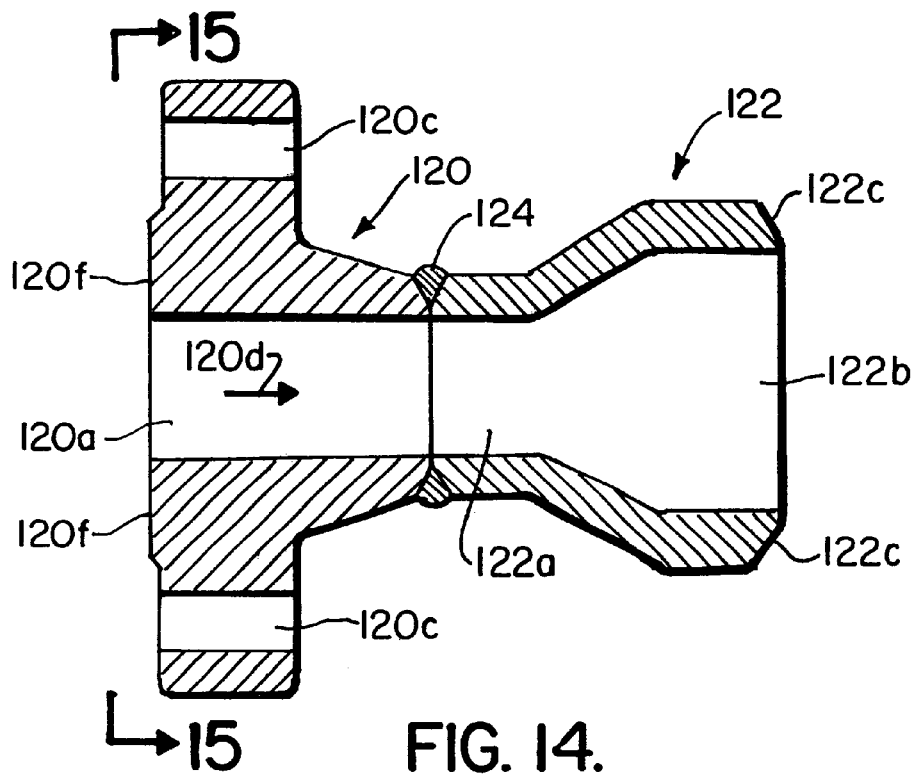
FIG. 14 is a cross-sectional, side view of a prior art raised face flange and ring assembly having a weld neck reducer welded thereto.
Figure 15:
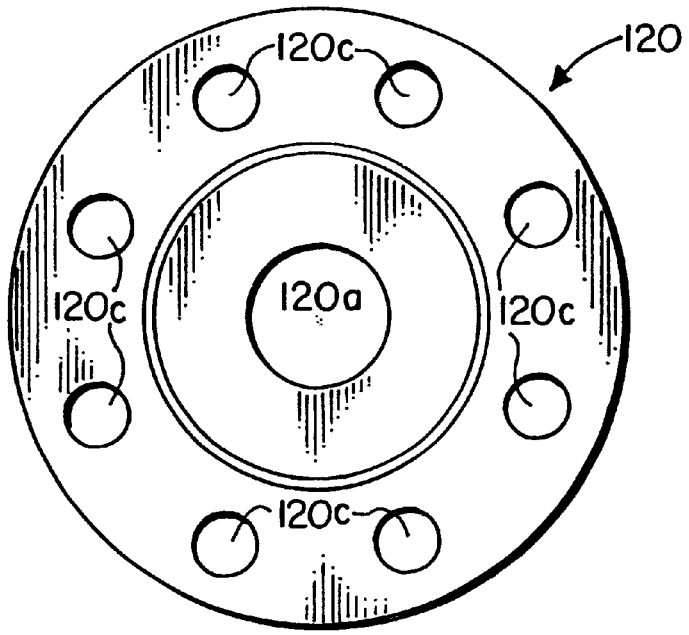
FIG. 15 is a plan view of the flange shown in FIG. 14 taken along line 15—15 of FIG. 14.

The prior art flange 20 shown in FIG. 1 is referred to in the art as a ring joint flange. FIGS. 14 and 15 illustrate the conventional procedure used in the art for connecting small diameter metal pipe such as steel pipe to larger diameter metal pipe. Referring now to FIGS. 14 and 15, a prior art metal pipe flange is generally indicated by the numeral 120 and has a flat raised face 120*f*. The prior art flange 120 shown in FIG. 15 is referred to in the art as a raised face flange. Pipe flange 120 has a central cylindrical bore 120*a* through which fluids under superatmospheric pressure flow.

A prior metal art weld neck reducer generally indicated by the numeral 122 is welded to pipe flange 120 by weld 124. Weld neck reducer 122 has a central cylindrical bore 122*a* axially aligned with a larger central cylindrical bore 122*b*. The diameter of central bore 122*a* is identical to the diameter of central bore 120*a* of flange 120. Pipe (not shown) having a central bore diameter identical to the central cylindrical bore diameter 122*b* of weld neck reducer 122 may then be welded to the end 122*c* of weld neck reducer 122.

A second flange (not shown) identical to flange 120 is bolted to pipe flange 120 by bolts (not shown) placed in cylindrical bolt holes 120*c* of flange 120. Preferably, a thin, flat, circular gasket is placed between the two flanges as is known in the art. Thus, small pipe (not shown), such as two-inch steel line pipe, connected to flange 120 can be connected to larger diameter pipe (not shown), such as four-inch steel line pipe, by welding the larger pipe to the end 122*c* of weld neck reducer 122. Two-inch and four-inch steel line pipe referred to herein refers to the nominal size of the pipe as is known to those skilled in the art, not to the inside or outside diameter of the pipe.

When the bolts (not shown) connecting flange 120 to the second flange (not shown) are tightened with sufficient torque to force the two flanges into contact with each other, a high pressure seal between flange 120 and the second flange (not shown) bolted thereto.

In common practice, a small diameter metal pipe, such as a two-inch steel line pipe, conveys high pressure fluids such as gas and/or petroleum, to flange 120. The fluids flow through bore 120*a* in flange 120 in the direction indicated by the arrow 120*d* and onward through bore 122*b* of weld neck reducer 122 to a larger diameter metal pipe (not shown) welded to the end 122*c* of weld neck reducer 122.

Erosion of the interior walls of bore 120*a* of flange 120 and the interior walls of bore 122*a* of weld neck reducer 122 by the fluids flowing therethrough commonly occurs in the vicinity of weld 124. The fluids flowing through flange 120 and weld neck reducer 122 may be under pressures from 2,000 pounds per square inch to 10,000 pounds per square inch and have very high velocity flowing through the pipe. Petroleum and gas fluids commonly contain particles of sand therein which are abrasive and accelerate the rate of erosion in the vicinity of weld 124.

Referring now to FIGS. 16 and 17–21, the fourth embodiment of the flange and liner of the present invention can be seen to include a metal flange assembly generally indicated by the numeral 130 having a flange section generally indicated by the numeral 132 with a flat, raised face 132*f* and a reducer section generally indicated by the numeral 134. Flange assembly 130 is preferably integrally formed from a single piece of high-strength, corrosion and abrasion resistant steel alloy and meets or exceeds API (American Petroleum Institute) standards for strength and dimensions.

Flange section 132 has a central cylindrical bore 132*a*. Reducer section 134 has a central cylindrical bore 134*a* axially aligned with cylindrical bore 132*a* and having a larger diameter than central cylindrical bore 132*a*. Central cylindrical bore 132*a* is joined to central cylindrical bore 134*a* by a tapered or beveled section 134*c*. Metal pipe such as steel pipe (not shown) having a central bore diameter identical to the central cylindrical bore diameter 134*a* of reducer section 134 may then be welded to the end beveled end 134*b* of reducer section 134.

As shown in FIGS. 16, 18, 20, and 21, flange assembly 130 has a replaceable metal liner generally indicated by the numeral 136 which is received in central cylindrical bore 132*a*. Preferably, flange liner 136 is slidably received in said central cylindrical bore 132*a* and fits snugly therein. Flange liner 136 has a central cylindrical bore 136*a* through which fluids flow in the direction indicated by the arrow 137 shown in FIGS. 16 and 20. Liner 136 is preferably integrally formed from a single piece of high-strength, corrosion and abrasion resistant steel alloy and meets or exceeds API (American Petroleum Institute) standards for strength and dimensions.

Figure 16:
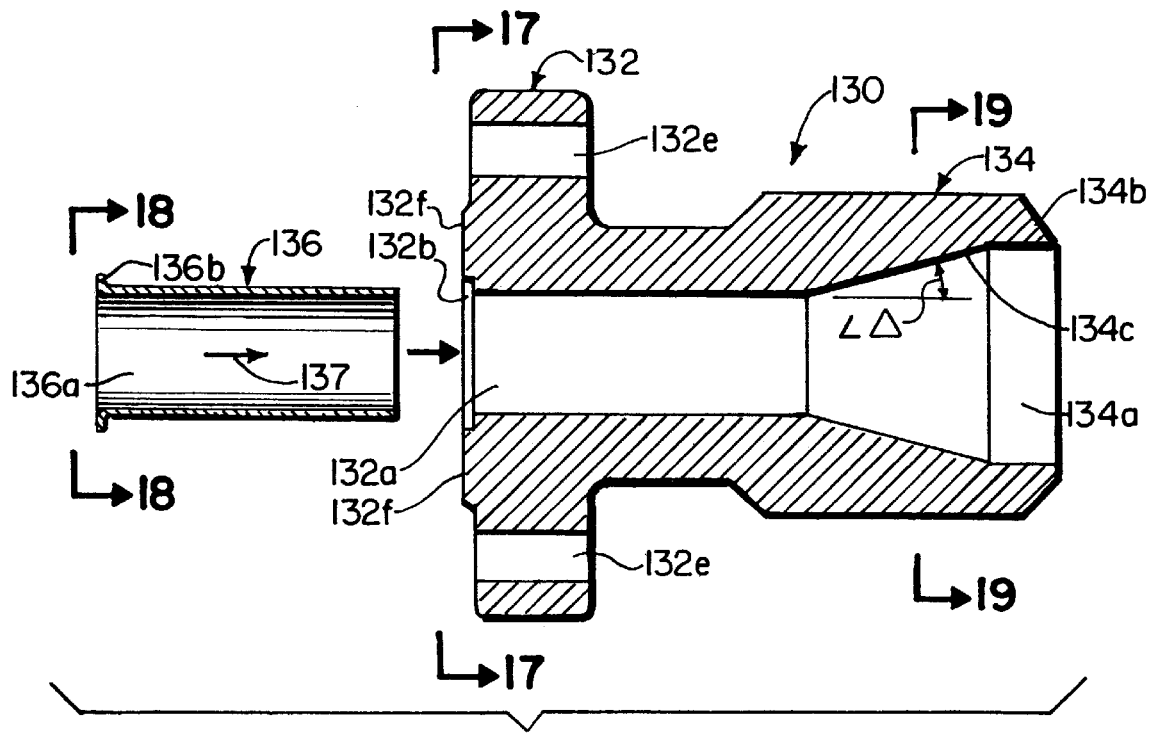
FIG. 16 is a cross-sectional, side view of a fourth embodiment of a flange and liner of the invention.

Liner 136 also preferably has a lip section 136*b* at the upstream end thereof shown in FIGS. 16, 18, 20 and 21 for seating liner 136 in recess 132*b* of flange section 132 shown in FIG. 16. Recess 132*b* is generally cylindrical in shape to receive lip 136*b* of liner 136.

Liner 136 has a length sufficient to completely enclose and protect the entire length of central cylindrical bore 132*a* from erosion by fluids and sand particles which may flow therethrough. Liner 136 is made from erosion and abrasion resistant metal alloy. Liner 136 is preferably replaced periodically as liner 136 is eroded and/or abraded by the fluids and sand particles flowing therethrough prior to liner 136 being punctured or ruptured due to erosion and/or abrasion. Periodic replacement of liner 136 prior to rupture of liner 136 prevents erosion of central cylindrical bore 132*a* of flange assembly 130. The resultant prevention of the erosion of central bore 132*a* greatly extends the life of flange assembly 130 and prevents dangerous ruptures and explosions which have occurred in flange and reducer assemblies of the prior art such as the prior art flange and weld neck reducer assemblies shown in FIGS. 14 and 15.

A second flange (not shown) identical to flange 120 shown in FIG. 14 is bolted to flange section 132 of flange assembly 130 by bolts (not shown) placed in cylindrical bolt holes 32*e* of flange section 132. Thus, small pipe (not shown), such as pipe two-inch steel line pipe, connected to flange section 132 by a flange identical to flange 120, can be connected to larger diameter pipe (not shown), such four-inch steel line pipe, by welding the larger pipe to the end 134*b* of reducer section 134. When the bolts (not shown) connecting flange assembly 130 to the second flange (not shown) identical to flange 120 is tightened with sufficient torque to force the two flanges into contact with each other. Thus, a high pressure seal is formed between flange assembly 130 and the second flange (not shown) identical to flange 120 bolted thereto. Preferably, a thin, flat, circular gasket having a central circular opening therein is placed between flange section 132 and the flange such as flange 120 to be bolted thereto. Such gaskets are known in the art and are usually one-sixteenth to one-eighth inch thick.

Figure 16A:
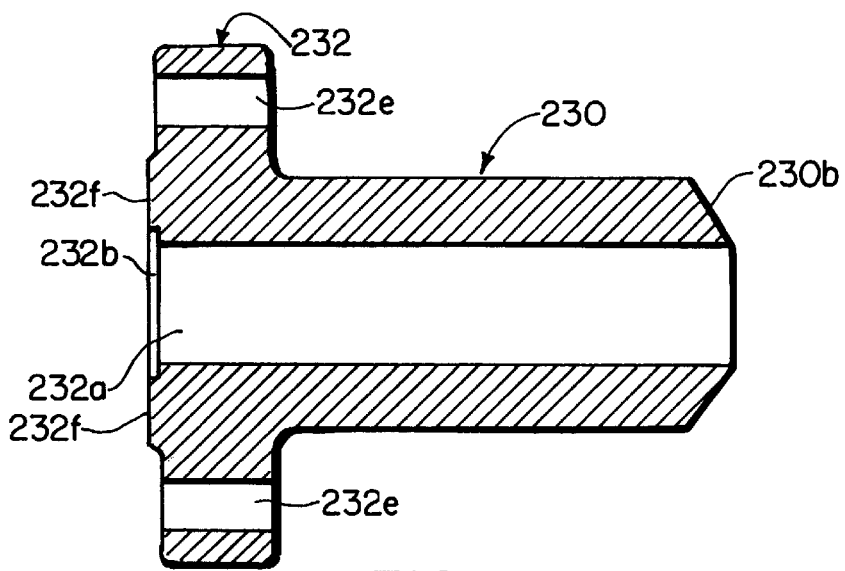
FIG. 16A is a cross-sectional, side view of a fifth embodiment of a flange and liner of the invention.
Figure 21:
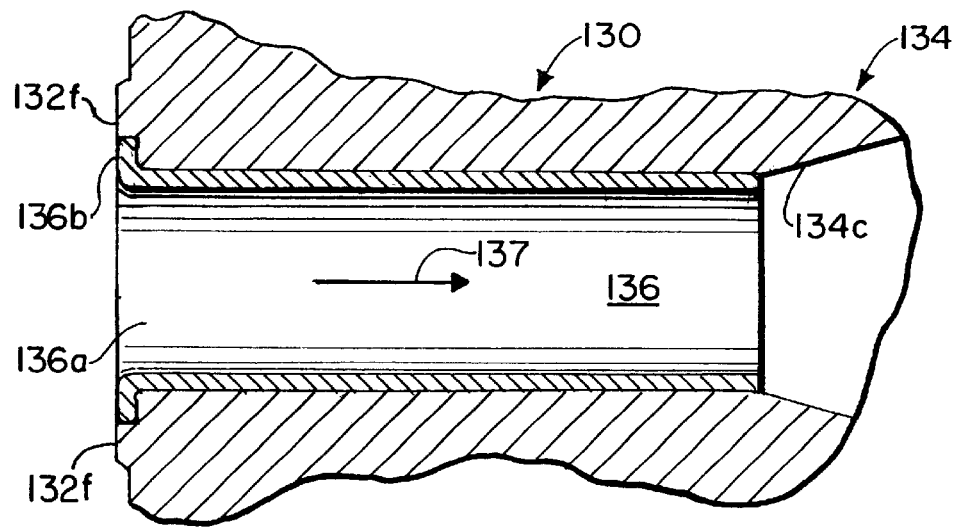
FIG. 21 is a partly cut-away, enlarged, detailed view of a portion of the flange shown in FIG. 16 with the liner seated therein.

In FIG. 16*a* is shown a fifth embodiment of the flange and liner assembly of the invention generally indicated by the numeral 230. Flange 230 is adapted to receive liner 136 and connect two sections of pipe (not shown) which have the same diameter, whereas flange 130 shown in FIG. 16 is adapted to connect a first pipe to a larger diameter second pipe. Flange assembly 230 is preferably integrally formed from a single piece of high-strength, corrosion and abrasion resistant steel alloy and meets or exceeds API (American Petroleum Institute) standards for strength and dimensions. Flange 230 has a flange section generally indicated by the numeral 232 having recess 232b therein for receiving the lip section 136b of liner 136 at the upstream end thereof in a similar manner to that shown in FIGS. 16, 18, 20 and 21 for seating liner 136 in recess 132b of flange section 132 shown in FIG. 16. Recess 232b is generally cylindrical in shape to receive lip 136b of liner 136.

Flange section 232 has a central cylindrical bore 232a and a flat, raised face 232f. Central cylindrical bore 232a has the same diameter throughout its entire length. Metal pipe such as steel pipe (not shown) having a central bore diameter identical to the central cylindrical bore diameter 232a may then be welded to the beveled end 230b of flange 230. Thus, pipe (not shown), such as pipe two-inch steel line pipe, connected to flange section 232 by a flange identical to flange 120, can be connected to pipe (not shown) of the same diameter by welding the larger pipe to the beveled end 230b of flange 230. When the bolts (not shown) connecting flange assembly 230 to the second flange (not shown) identical to flange 120 is tightened with sufficient torque to force the two flanges into contact with each other. Thus, a high pressure seal is formed between flange assembly 230 and the second flange (not shown) identical to flange 120 bolted thereto.

Figure 22:
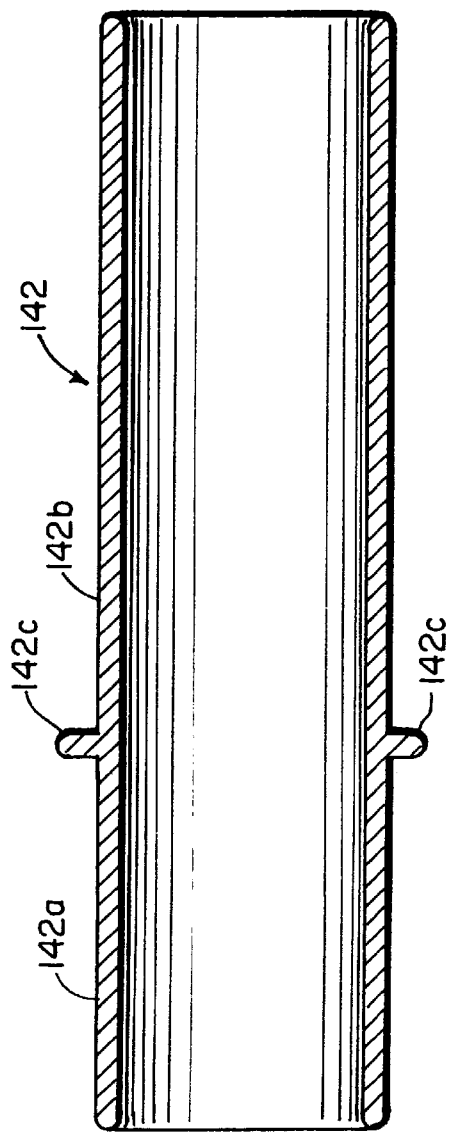
FIG. 22 is a side view of a sixth embodiment of the liner of the invention for insertion in a choke assembly and in the flange of the fifth embodiment of the invention.
Figure 23:
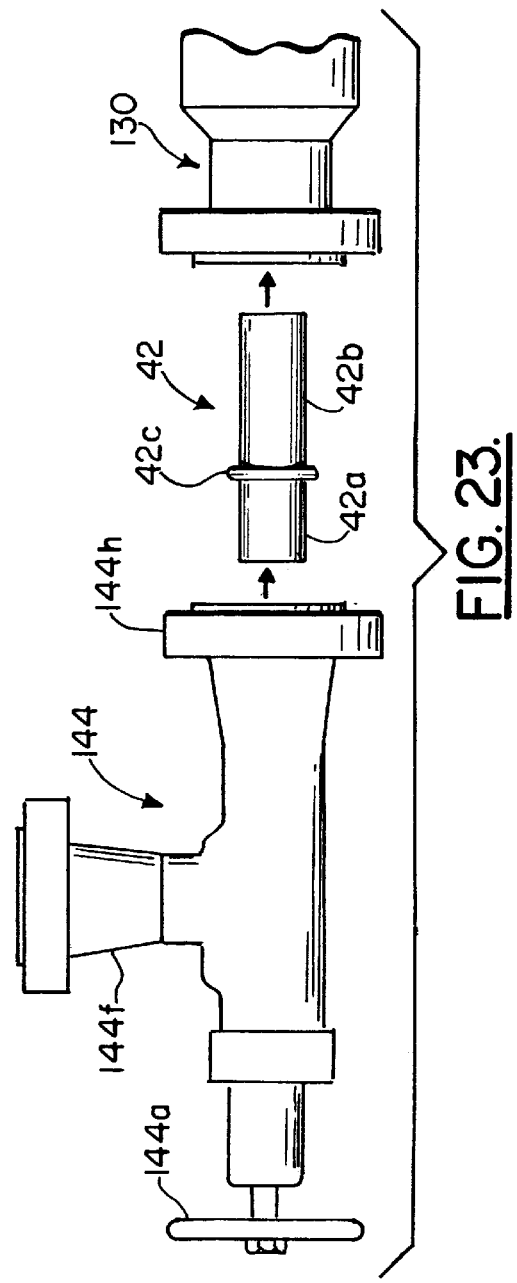
FIG. 23 is a side view of the sixth embodiment of the liner of the invention aligned for insertion in a choke assembly and in the flange of the fifth embodiment of the invention.
Figure 24:
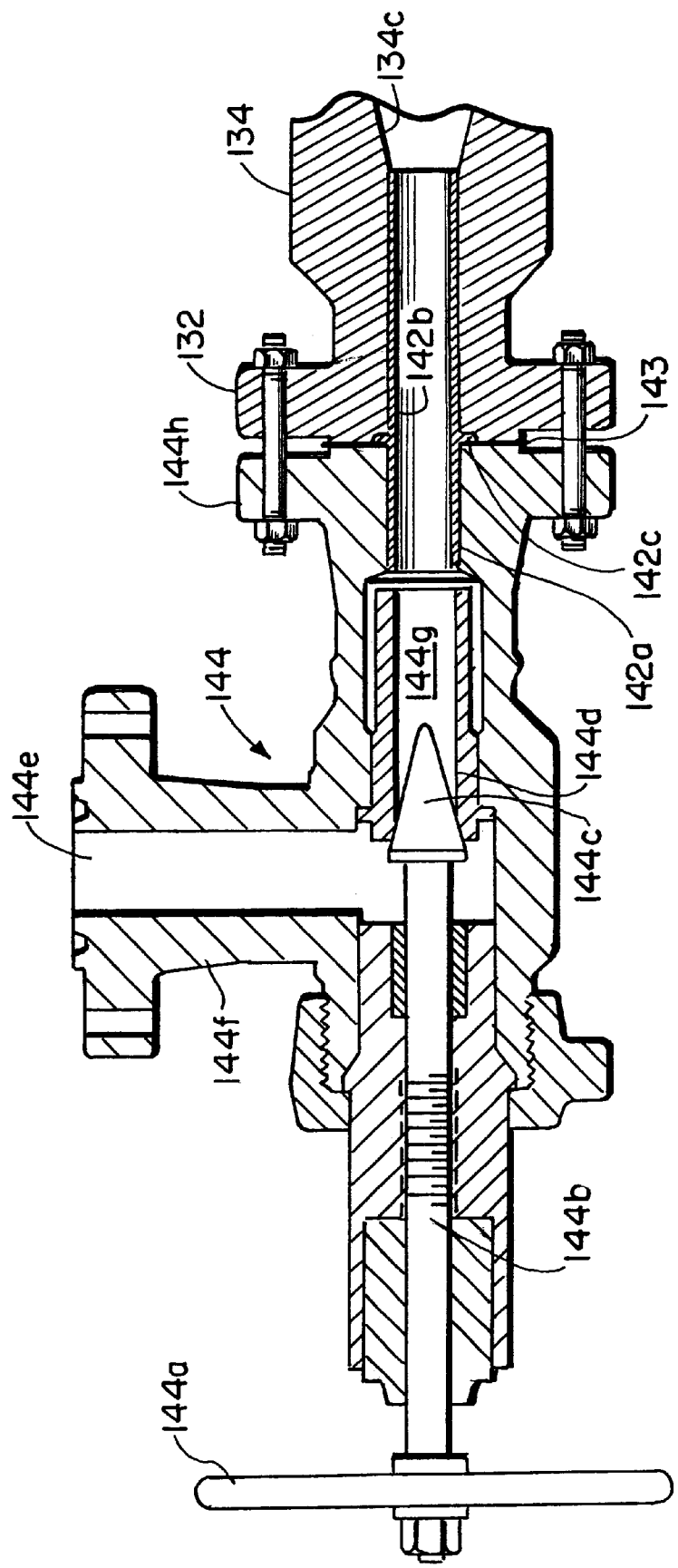
FIG. 24 is a side, partly cross-sectional view of the sixth embodiment of the liner of the invention inserted and seated in the choke assembly shown in FIG. 23 and the flange of the fifth embodiment of the invention with the choke assembly being bolted to the flange of the fifth embodiment of the invention.
Figure 27:
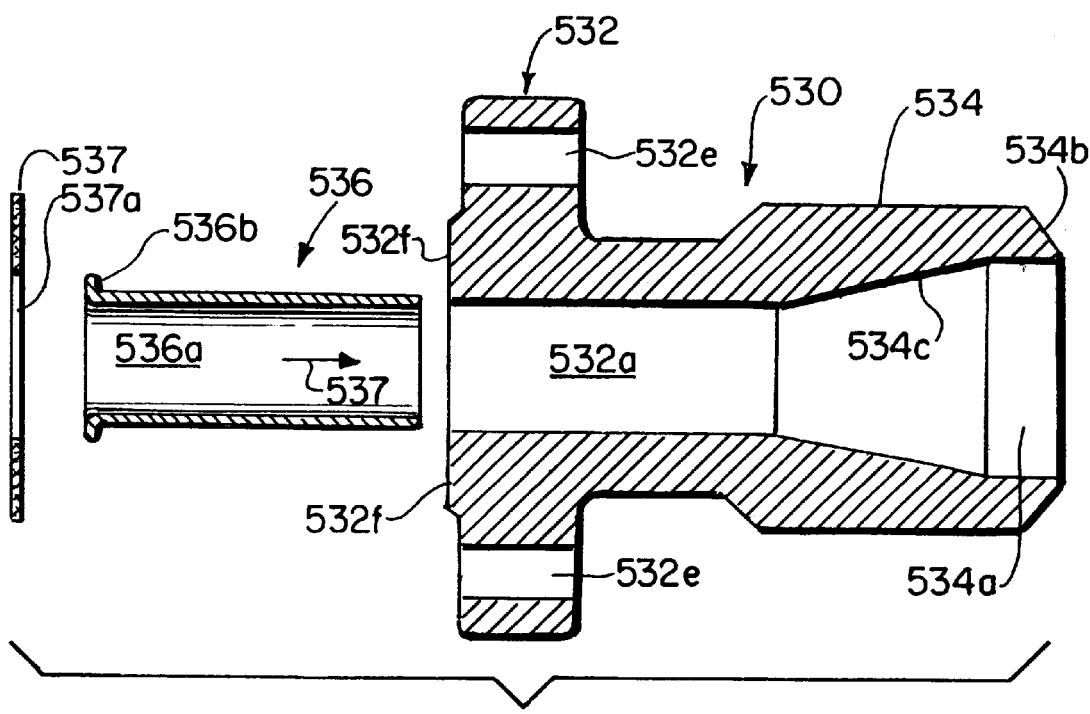
FIG. 27 is a cross-sectional, exploded side view of a ninth embodiment of a flange and liner of the invention.

In FIGS. 22–24 is shown a sixth embodiment of the liner of the invention generally indicated by the numeral 142. Liner 142 is used to connect a conventional choke assembly generally indicated by the numeral 144 to the flange assembly 130 of the present invention. Liner 142 is similar to liner 140 having an additional hollow cylindrical section 142a integrally formed therewith for receipt in the discharge flange 144h of choke 144. Hollow cylindrical section 142a is preferably slidably received in discharge flange 144h and is snugly received therein. Liner 142 has a circular rib 142c connected to the intersection of hollow cylindrical section 142a and hollow cylindrical section 142b. Ring 142c is received in recess 132b of flange 132 of flange assembly 130 when liner 142 is placed in flange assembly 130 as shown in FIG. 24. Preferably, a thin, flat, circular gasket 143 having a central circular opening having a diameter identical to the outside diameter of liner 142 is placed between flange 144h and flange 132. Such gaskets 143 are known in the art and are usually one-sixteenth to one-eighth inch thick.

Choke assembly 144 is a conventional choke assembly well known in the art. As known to those skilled in the art, choke assembly 144 has a circular handle 144a connected to a rotatable threaded shaft 144b having a cone 144c on the end thereof which fits against seat 144d. As shown in FIG. 24, cone 144c is seated against seat 144d, preventing flow therethrough. When handle 144a is rotated to turn shaft 144b and withdraw cone 144c away from seat 144d, fluids can flow through hollow cylindrical passage 144e in flange 144f around cone 144c and into hollow cylindrical passage 144g in flange 144h. From passage 144g fluids flow into hollow cylindrical section 142a. hollow cylindrical section 142b, and outward through beveled portion 134c.

An additional flange (not shown) may be bolted to flange 144f of choke 144 to supply fluids such as petroleum and gas thereto. Flange assembly 130 of the invention is shown bolted in FIG. 24 to flange 144h of the discharge end of choke 144. Liner 142 prevents erosion of the hollow cylindrical portion of flange 144a covered by hollow cylindrical section 142a of liner 142, and liner 142 prevents erosion of the portion of flange assembly 130 of the invention covered by hollow cylindrical portion 142b of liner 142.

Figures 25, 26:
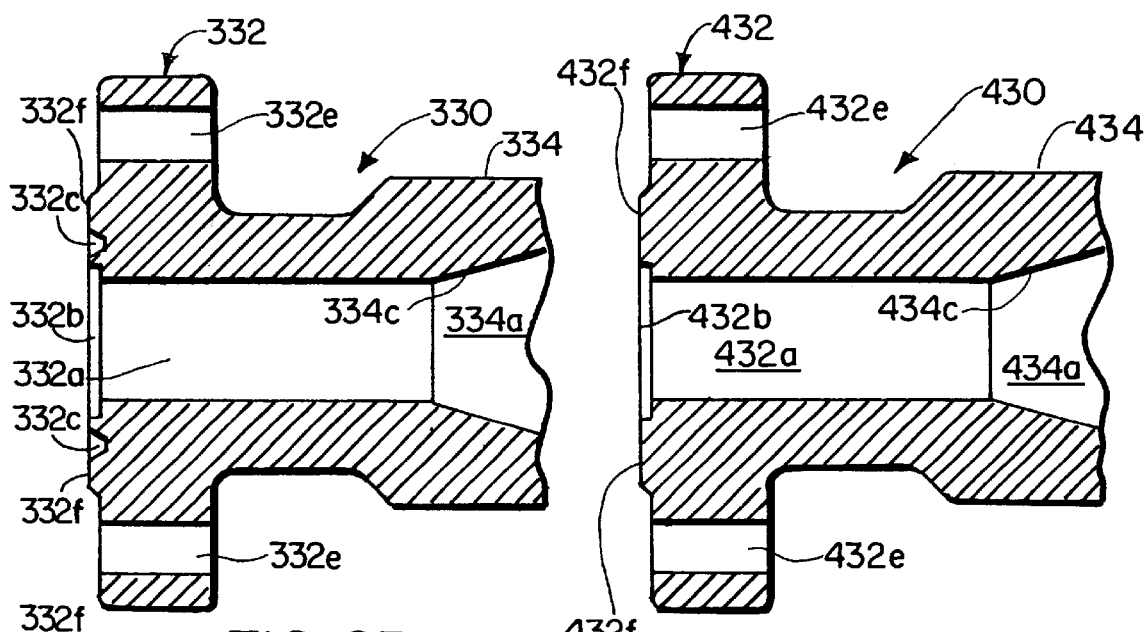
FIG. 25 is a cross-sectional, enlarged, partly cut-away view of a seventh embodiment of the invention having a tapered groove in the face thereof similar to the embodiment shown in FIG. 4.
FIG. 26 is a cross-sectional, side view of an eighth embodiment of a flange and liner of the invention similar to the embodiment shown in FIG. 16.

Referring now to FIG. 25, there is shown a cross-sectional, enlarged, partly cut-away view of a seventh embodiment of the invention generally indicated by the numeral 330 having a tapered groove 332c in the face 332f thereof similar to the embodiment shown in FIG. 4. Flange assembly 330 invention can be seen to include a flange section generally indicated by the numeral 332 and a reducer section generally indicated by the numeral 334. Flange assembly 330 is preferably integrally formed from a single piece of high-strength, corrosion and abrasion resistant steel alloy and meets or exceeds API (American Petroleum Institute) standards for strength and dimensions.

A circular ring generally indicated by the numeral 38 in FIG. 9 can be aligned for placement in circular tapered groove 332c of flange 330, as ring 38 was aligned for placement in circular tapered groove 32b of flange assembly 30 shown in FIG. 9, to function as a seal when a second flange (not shown) identical to flange 20 shown in FIG. 1 is bolted to flange section 332 of flange assembly 330 by bolts (not shown) placed in cylindrical bolt holes 332e of flange section 332. Thus, small pipe (not shown), such as pipe two-inch steel line pipe, connected to flange section 332 by a flange identical to flange 20, can be connected to larger diameter pipe (not shown), such four-inch steel line pipe, by welding the larger pipe to the end of reducer section 334.

As mentioned above in the description of the embodiment of the invention shown in FIG. 9, circular ring 38 is identical to ring 26 shown in FIG. 1 and is a hollow cylinder 38a having two-flat faces 38b and 38c. Flat face 38b is received in groove 332c and is deformed when a second flange (not shown) identical to flange 20 is bolted to flange assembly 330 as mentioned above. Circular ring 38 is deformed to assume the shape of groove 332c when the bolts (not shown) connecting flange assembly 330 to the second flange (not shown) identical to flange 20 are tightened with sufficient torque to force the two flanges into contact with each other. Thus, circular ring 38 forms a high pressure seal between flange assembly 330 and the second flange (not shown) identical to flange 20 bolted thereto.

Flange section 330 has a central cylindrical bore 332a. Reducer section 334 has a conical cylindrical bore 334a axially aligned with cylindrical bore 332a and having any desired end shape. For example, the end of reducer section 334 could be beveled as shown in FIG. 16 or any other desired shape. For example, the end of reducer section 334 could be vertical, rather than beveled as shown in FIG. 16 Metal pipe such as steel pipe (not shown) having a central bore diameter identical to the diameter of the end of reducer section 334 may then be welded to the end of reducer section 334.

Flange assembly 330 shown in FIG. 25 is adapted to receive in central cylindrical bore 332a the replaceable metal liner generally indicated by the numeral 136 shown in FIGS. 16, 18, 20, and 21. Preferably, flange liner 136 is slidably received in said central cylindrical bore 332a and fits snugly therein. As stated above, flange liner 136 has a central cylindrical bore 136a through which fluids flow in the direction indicated by the arrow 137 shown in FIGS. 16 and 20. Liner 136 is preferably integrally formed from a single piece of high-strength, corrosion and abrasion resistant steel alloy and meets or exceeds API (American Petroleum Institute) standards for strength and dimensions.

Liner 136 also preferably has a lip section 136b at the upstream end thereof shown in FIGS. 16, 18, 20 and 21 for seating liner 136 in central cylindrical bore 332a and recess 332b of flange section 332 shown in FIG. 25. Recess 332b is generally cylindrical in shape to receive lip 136b of liner 136.

Liner 136 has a length sufficient to completely enclose and protect the entire length of central cylindrical bore 332a from erosion by fluids and sand particles which may flow therethrough. Liner 136 is made from erosion and abrasion resistant metal alloy. Liner 136 is preferably replaced periodically in bore 332a as liner 136 is eroded and/or abraded by the fluids and sand particles flowing therethrough prior to liner 136 being punctured or ruptured due to erosion and/or abrasion. Periodic replacement of liner 136 prior to rupture of liner 136 prevents erosion of central cylindrical bore 332a of flange assembly 330. The resultant prevention of the erosion of central bore 332a greatly extends the life of flange assembly 330 and prevents dangerous ruptures and explosions which have occurred in flange and reducer assemblies of the prior art such as the prior art flange and weld neck reducer assemblies shown in FIGS. 1–3.

Referring now to FIG. 26, there is shown a cross-sectional, enlarged, partly cut-away view of a eighth embodiment of the invention generally indicated by the numeral 430 having a raised face similar to the embodiment shown in FIGS. 14–16 and 17–21. Flange assembly 430 invention can be seen to include a flange section generally indicated by the numeral 432 having a flat, raised face 432f and a reducer section generally indicated by the numeral 434. Flange assembly 430 is preferably integrally formed from a single piece of high-strength, corrosion and abrasion resistant steel alloy and meets or exceeds API (American Petroleum Institute) standards for strength and dimensions.

Flange section 430 has a central cylindrical bore 432a. Reducer section 434 has a conical cylindrical bore 434a axially aligned with cylindrical bore 432a and having any desired end shape. For example, the end of reducer section 434 could be beveled as shown in FIG. 16 or any other desired shape. For example, the end of reducer section 434 could be vertical, rather than beveled as shown in FIG. 16. Metal pipe such as steel pipe (not shown) having a central bore diameter identical to the diameter of the end of reducer section 434 may then be welded to the end of reducer section 434.

Flange assembly 430 shown in FIG. 26 is adapted to receive in central cylindrical bore 432a the replaceable metal liner generally indicated by the numeral 136 shown in FIGS. 16, 18, 20, and 21. Preferably, flange liner 136 is slidably received in said central cylindrical bore 432a and fits snugly therein. As stated above, flange liner 136 has a central cylindrical bore 136a through which fluids flow in the direction indicated by the arrow 137 shown in FIGS. 16 and 20. Liner 136 is preferably integrally formed from a single piece of high-strength, corrosion and abrasion resistant steel alloy and meets or exceeds API (American Petroleum Institute) standards for strength and dimensions.

Liner 136 also preferably has a lip section 136b at the upstream end thereof shown in FIGS. 16, 18, 20 and 21 for seating liner 136 in central cylindrical bore 432a and recess 432b of flange section 432 shown in FIG. 26. Recess 432b is generally cylindrical in shape to receive lip 136b of liner 136.

Liner 136 has a length sufficient to completely enclose and protect the entire length of central cylindrical bore 432a from erosion by fluids and sand particles which may flow therethrough. Liner 136 is made from erosion and abrasion resistant metal alloy. Liner 136 is preferably replaced periodically in bore 432a as liner 136 is eroded and/or abraded by the fluids and sand particles flowing therethrough prior to liner 136 being punctured or ruptured due to erosion and/or abrasion. Periodic replacement of liner 136 prior to rupture of liner 136 prevents erosion of central cylindrical bore 432a of flange assembly 430. The resultant prevention of the erosion of central bore 432a greatly extends the life of flange assembly 430 and prevents dangerous ruptures and explosions which have occurred in flange and reducer assemblies of the prior art such as the prior art flange and weld neck reducer assemblies shown in FIGS. 14–15.

Referring now to FIGS. 27, 28, 30, and 31 the ninth embodiment of a flange and liner of the invention can be seen to include a metal flange assembly generally indicated by the numeral 530 having a flange section generally indicated by the numeral 532 and a reducer section generally indicated by the numeral 134. Flange assembly 530 is preferably integrally formed from a single piece of high-strength, corrosion and abrasion resistant steel alloy and meets or exceeds API (American Petroleum Institute) standards for strength and dimensions.

Flange section 532 has a central cylindrical bore 532a. Reducer section 534 has a central cylindrical bore 534a axially aligned with cylindrical bore 532a and having a larger diameter than central cylindrical bore 532a. Central cylindrical bore 532a is joined to central cylindrical bore 534a by a tapered or beveled section 534c. Metal pipe such as steel pipe (not shown) having a central bore diameter identical to the central cylindrical bore diameter 534a of reducer section 534 may then be welded to the end beveled end 534b of reducer section 534.

As shown in FIGS. 27, 28, 30 and 31, flange assembly 530 has a replaceable metal liner generally indicated by the numeral 536 which is received in central cylindrical bore 532a. Preferably, flange liner 536 is slidably received in said central cylindrical bore 532a and fits snugly therein. Flange liner 536 has a central cylindrical bore 536a through which fluids flow in the direction indicated by the arrow 537 shown in FIG. 27. Liner 536 is preferably integrally formed from a single piece of high-strength, corrosion and abrasion resistant steel alloy and meets or exceeds API (American Petroleum Institute) standards for strength and dimensions.

Figure 28:
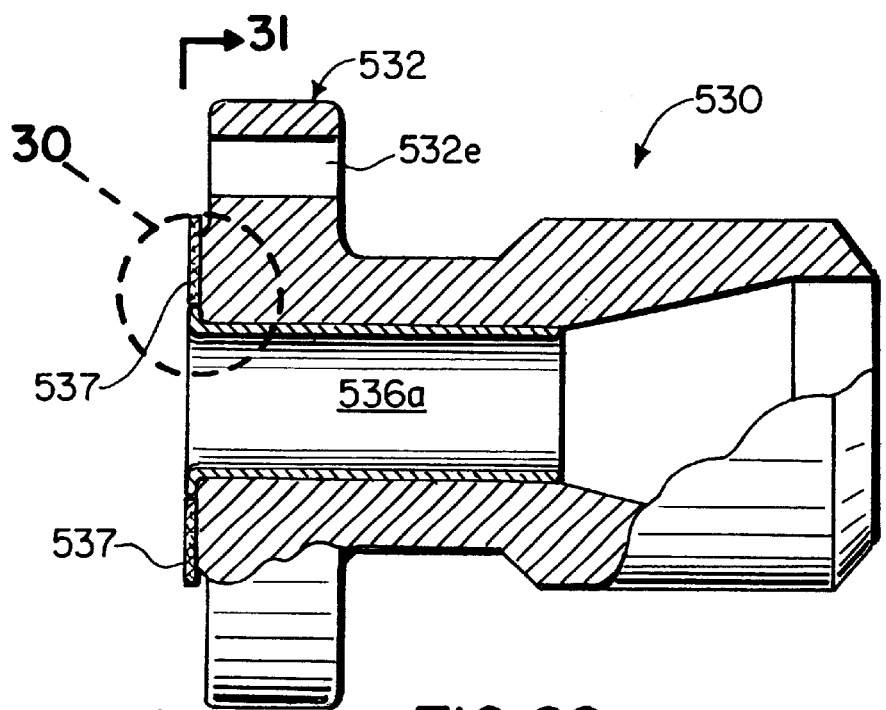
FIG. 28 is a cross-sectional, assembled side view of the flange and liner of FIG. 27.

Liner 536 is slidably received in central cylindrical bore 532a of flange assembly 530 as shown in FIG. 28. Liner 536 has a lip section 536b at the upstream end thereof shown in FIGS. 27, 28, 30, and 31 which rests against the raised face 532f of flange section 532 when liner 536 is received in central cylindrical bore 532a.

Figure 30:
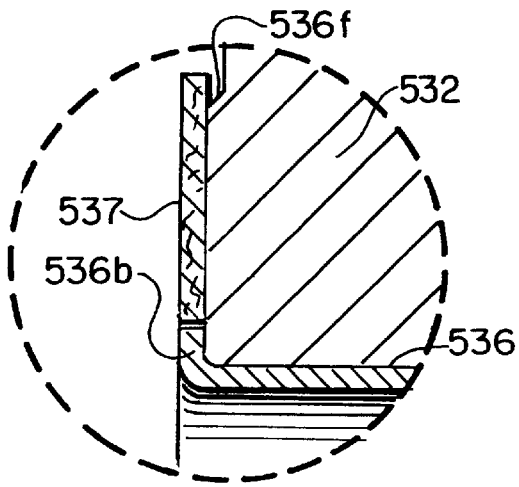
FIG. 30 is a detailed view of the area of the flange and liner assembly shown in FIG. 28 in the dotted circle labeled 30.
Figure 31:
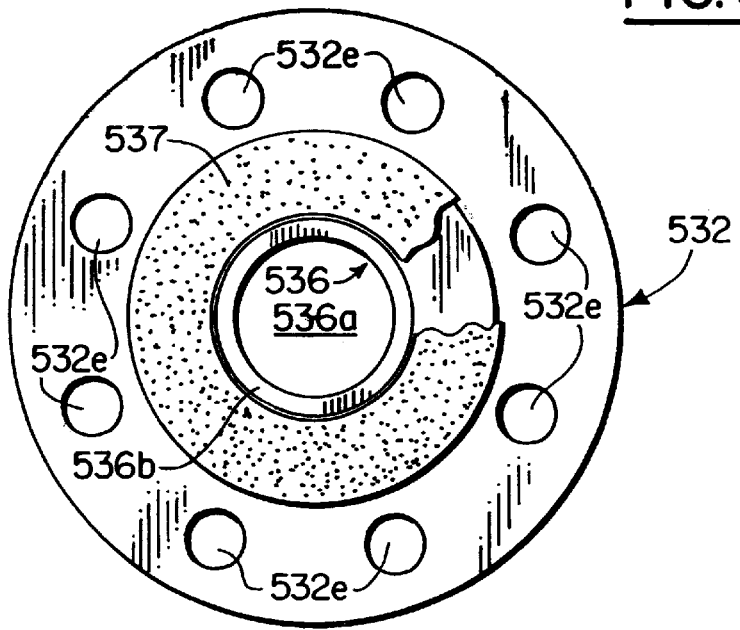
FIG. 31 is a plan view of the flange shown in FIG. 28 taken along line 31—31 of FIG. 28.

A circular gasket 537 having circular opening 537a therein is placed around liner 536 and against raised face 532f as shown in FIGS. 28, 30, and 31. Any conventional gasket material known in the art may be used to make circular gasket 537.

Liner 536 has a length sufficient to completely enclose and protect the entire length of central cylindrical bore 532a from erosion by fluids and sand particles which may flow therethrough. Liner 536 is made from erosion and abrasion resistant metal alloy. Liner 536 is preferably replaced periodically as liner 536 is eroded and/or abraded by the fluids and sand particles flowing therethrough prior to liner 536 being punctured or ruptured due to erosion and/or abrasion. Periodic replacement of liner 536 prior to rupture of liner 536 prevents erosion of central cylindrical bore 532a of flange assembly 530. The resultant prevention of the erosion of central bore 532a greatly extends the life of flange assembly 530 and prevents dangerous ruptures and explosions which have occurred in flange and reducer assemblies of the prior art such as the prior art flange and weld neck reducer assemblies shown in FIGS. 14 and 15.

A second flange (not shown) identical to flange 120 shown in FIG. 14 is bolted to flange section 532 of flange assembly 530 by bolts (not shown) placed in cylindrical bolt holes 532e of flange section 532. Thus, small pipe (not shown), such as pipe two-inch steel line pipe, connected to flange section 532 by a flange identical to flange 120, can be connected to larger diameter pipe (not shown), such four-inch steel line pipe, by welding the larger pipe to the end 534b of reducer section 534. When the bolts (not shown) connecting flange assembly 530 to the second flange (not shown) identical to flange 120 is tightened with sufficient torque to force the two flanges with gasket 537 therebetween into contact with gasket 537. Thus, a high pressure seal is formed between flange assembly 530 and the second flange (not shown) identical to flange 120 bolted thereto.

Figure 29:
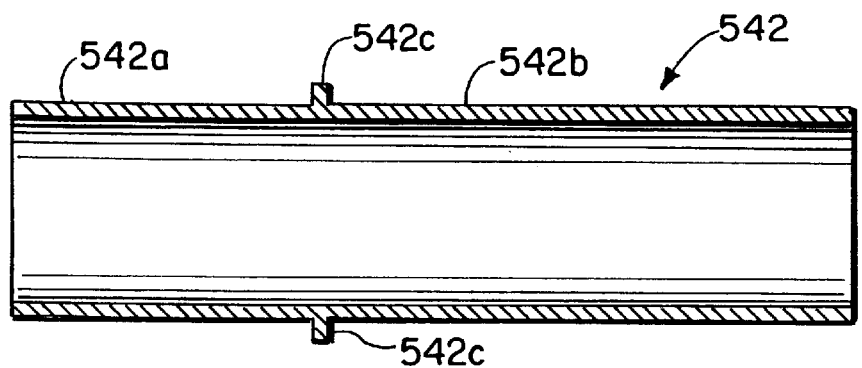
FIG. 29 is a side view of a tenth embodiment of the liner of the invention for insertion in a choke assembly and in the flange of the ninth embodiment of the invention.

In FIG. 29 is shown a tenth embodiment of the liner of the invention generally indicated by the numeral 542 for insertion in a choke assembly. Liner 542 is used to connect a conventional choke assembly generally indicated by the numeral 144 in FIG. 24 to the flange assembly 530 of the present invention. Liner 542 is similar to liner 536 having an additional hollow cylindrical section 542a integrally formed therewith for receipt in the discharge flange 144h of choke 144. Hollow cylindrical section 542a is preferably slidably received in discharge flange 144h and is snugly received therein. Liner 542 has a circular rib 542c connected to the intersection of hollow cylindrical section 142a and hollow cylindrical section 542b. Ring 542c rests against the raised face 532f of flange assembly 530 when liner 542 is placed in flange assembly 530. Preferably, a thin, flat, circular gasket 143 is placed between flange 144h and flange 532. Such gaskets 143 are known in the art and are usually one-sixteenth to one-eighth inch thick.

Although the preferred embodiments of the invention have been described in detail above, it should be understood that the invention is in no sense limited thereby, and its scope is to be determined by that of the following claims:

What is claimed is:

1. An erosion and abrasion resistant metal pipe flange assembly having a flat, raised face flange section at the upstream end thereof connectable to a conventional metal pipe flange and a beveled downstream end for welding metal pipe thereto, the pipe flange assembly being used in containing and conveying high pressure fluids flowing from a smaller diameter pipe to a larger diameter pipe, said pipe flange assembly comprising:
   a. a metal flange section having a flat, raised face and a central cylindrical bore therein extending completely through said flange section and said flat, raised face, said central cylindrical bore having a recess adjacent to the upstream end thereof in said raised face, said metal flange section having a flange integrally formed therewith at one end thereof for connecting said metal flange section to a conventional metal pipe flange, and
   b. a metal reducer section integrally formed with said flange section, said metal reducer section having a central cylindrical bore therein which is larger in diameter than said central cylindrical bore of said flange section, said metal reducer section having the outer surface of the end thereof adjacent to said cylindrical bore of said metal reducer section beveled for welding a pipe thereto, said central cylindrical bore of said flange section being joined to said central cylindrical bore of said reducer section by a beveled section, and
   c. a replaceable hollow metal cylindrical liner for preventing erosion and abrasion of the interior of said pipe flange assembly, said liner having two ends and a lip section at one end thereof adapted for seating in said recess, said lip section extending completely around said one end of said liner, said liner being slidably received in said central cylindrical bore of said flange section and slidably removable from said central bore of said flange section when said liner becomes eroded and abraded.

2. The pipe flange assembly of claim 1 wherein said reducer section has a central, cylindrical bore therein which communicates with said central cylindrical bore of said flange section.

3. The pipe flange assembly of claim 1 wherein said central cylindrical bore of said reducer section is axially aligned with said central cylindrical bore of said flange section.

4. An erosion and abrasion resistant metal pipe flange assembly having a flange at the upstream end thereof connectable to a conventional metal pipe flange and a downstream end for welding metal pipe thereto, the pipe flange assembly being used in containing and conveying high pressure fluids flowing from a smaller diameter pipe to a larger diameter pipe, said pipe flange assembly comprising:
   a. a metal flange section having a central cylindrical bore therein extending completely through said flange section, said flange section having a first circular groove therein for receipt of a hollow, cylindrical sealing ring, said central cylindrical bore having a second groove adjacent to the upstream end thereof, said metal flange section having a flange integrally formed therewith at one end thereof for connecting said metal flange section to said conventional metal pipe flange, and
   b. a metal reducer section integrally formed with said flange section, said metal reducer section having a central cylindrical bore therein which is larger in diameter than said central cylindrical bore of said flange section, said central cylindrical bore of said flange section being joined to said central cylindrical bore of said reducer section by a beveled section, and
   c. a replaceable hollow metal cylindrical liner for preventing erosion and abrasion of the interior of said pipe flange assembly, said liner having two ends and a lip section at one end thereof adapted for seating in said second groove contained in said flange section, said lip section extending completely around said one end of said liner, said liner being slidably received in said central cylindrical bore of said flange section and slidably removable from said central bore of said flange section when said liner becomes eroded and abraded.

5. The pipe flange assembly of claim 4 wherein said reducer section has a central, cylindrical bore therein which communicates with said central cylindrical bore of said flange section.

6. The pipe flange assembly of claim 4 wherein said central cylindrical bore of said reducer section is axially aligned with said central cylindrical bore of said flange section.

7. An erosion and abrasion resistant metal pipe flange assembly having a flat, raised face flange section at the upstream end thereof connectable to a conventional metal pipe flange and a downstream end for welding metal pipe thereto, the pipe flange assembly being used in containing and conveying high pressure fluids flowing from a smaller diameter pipe to a larger diameter pipe, said pipe flange assembly comprising:
   a. a metal flange section having a flat, raised face and a central cylindrical bore therein extending completely through said flange section and said flat, raised face, said central cylindrical bore having a recess adjacent to the upstream end thereof in said raised face, said metal flange section having a flange integrally formed therewith at one end thereof for connecting said metal flange section to a conventional metal pipe flange, and b. a metal reducer section integrally formed with said flange section, said metal reducer section having a central cylindrical bore therein which is larger in diameter than said central cylindrical bore of said flange section, said central cylindrical bore of said flange section being joined to said central cylindrical bore of said reducer section by a beveled section, and c. a replaceable hollow metal cylindrical liner for preventing erosion and abrasion of the interior of said pipe flange assembly, said liner having two ends and a lip section at one end thereof adapted for seating in said recess, said lip section extending completely around said one end of said liner, said liner being slidably received in said central cylindrical bore of said flange section and slidably removable from said central bore of said flange section when said liner becomes eroded and abraded.

8. The pipe flange assembly of claim 7 wherein said reducer section has a central, cylindrical bore therein which communicates with said central cylindrical bore of said flange section.

9. The pipe flange assembly of claim 7 wherein said central cylindrical bore of said reducer section is axially aligned with said central cylindrical bore of said flange section.

10. An erosion and abrasion resistant metal pipe flange assembly having a flat, raised face flange section at the upstream end thereof connectable to a conventional metal pipe flange and a downstream end for welding metal pipe thereto, the pipe flange assembly being used in containing and conveying high pressure fluids flowing from a smaller diameter pipe to a larger diameter pipe, said pipe flange assembly comprising:

a. a metal flange section having said flat, raised face and a central cylindrical bore therein extending completely through said flange section and said flat, raised face, said metal flange section having a flange integrally formed therewith at one end thereof for connecting said metal flange section to said conventional metal pipe flange, and b. a metal reducer section integrally formed with said flange section, said metal reducer section having a central cylindrical bore therein which is larger in diameter than said central cylindrical bore of said flange section, said central cylindrical bore of said flange section being joined to said central cylindrical bore of said reducer section by a beveled section, and c. a replaceable hollow metal cylindrical liner for preventing erosion and abrasion of the interior of said pipe flange assembly, said liner having two ends and a lip section at one end thereof adapted for seating against said flat, raised face, said lip section extending completely around said one end of said liner, said liner being slidably received in said central cylindrical bore of said flange section and slidably removable from said central bore of said flange section when said liner becomes eroded and abraded.

11. The pipe flange assembly of claim 10 wherein said reducer section has a central, cylindrical bore therein which communicates with said central cylindrical bore of said flange section.

12. The pipe flange assembly of claim 10 wherein said central cylindrical bore of said reducer section is axially aligned with said central cylindrical bore of said flange section.

13. An erosion and abrasion resistant metal pipe flange assembly having a flat, raised face flange section at the upstream end thereof connectable to a conventional metal pipe flange and a beveled downstream end for welding metal pipe thereto, the pipe flange assembly being used in containing and conveying high pressure fluids flowing from a smaller diameter pipe to a larger diameter pipe, said pipe flange assembly comprising:

a. a metal flange section having said flat, raised face and a central cylindrical bore therein extending completely through said flange section and said flat, raised face, said central cylindrical bore having a recess adjacent to the upstream end thereof in said raised face, said metal flange section having a flange integrally formed therewith at one end thereof for connecting said metal flange section to said conventional metal pipe flange, and b. a replaceable hollow metal cylindrical liner for preventing erosion and abrasion of the interior of said pipe flange assembly, said liner having two ends and a lip section at one end thereof adapted for seating in said recess, said lip section extending completely around said one end of said liner, said liner being slidably received in said central cylindrical bore of said flange section and slidably removable from said central bore of said flange section when said liner becomes eroded and abraded, said liner having a central, cylindrical bore therein which communicates with said central clindrical bore of said flange section.

14. The pipe flange assembly of claim 13 wherein said central cylindrical bore of said liner is axially aligned with said central cylindrical bore of said flange section.

* * * * *